United States Patent
Sheaffer

(10) Patent No.: US 6,732,257 B1
(45) Date of Patent: May 4, 2004

(54) REDUCING THE LENGTH OF LOWER LEVEL INSTRUCTIONS BY SPLITTING AND RECOMBINING AN IMMEDIATE

(75) Inventor: Gad S. Sheaffer, Haifa (IL)

(73) Assignee: Intel Corporation, Santa Clara, CA (US)

(*) Notice: Subject to any disclaimer, the term of this patent is extended or adjusted under 35 U.S.C. 154(b) by 573 days.

(21) Appl. No.: 09/675,819

(22) Filed: Sep. 29, 2000

(51) Int. Cl.⁷ .............................................. G06F 9/455

(52) U.S. Cl. ..................... 712/210; 712/209; 712/227

(58) Field of Search ................................. 712/208, 209, 712/210, 227; 717/136

(56) References Cited

U.S. PATENT DOCUMENTS

| | | | | |
|---|---|---|---|---|
| 5,581,717 A | * | 12/1996 | Boggs et al. ................ | 712/208 |
| 5,745,722 A | * | 4/1998 | Matsumoto et al. ......... | 712/210 |
| 5,925,124 A | * | 7/1999 | Hilgendorf et al. .......... | 712/227 |
| 6,338,132 B1 | * | 1/2002 | Kyker et al. ................. | 712/211 |
| 6,442,680 B1 | * | 8/2002 | Elnozahy .................... | 712/227 |

* cited by examiner

Primary Examiner—Richard L. Ellis
(74) Attorney, Agent, or Firm—Blakely, Sokoloff, Taylor & Zafman LLP

(57) ABSTRACT

A method is disclosed in which a higher level instruction having an immediate is read from memory and translated into two lower level instructions. The first is to move a first portion of the immediate to a register, and the second includes a pointer to the register as well as a second portion of the immediate.

18 Claims, 2 Drawing Sheets

… …

REDUCING THE LENGTH OF LOWER LEVEL INSTRUCTIONS BY SPLITTING AND RECOMBINING AN IMMEDIATE

BACKGROUND

This invention is generally related to processor and instruction set architectures, and more particularly to processors for which certain higher level instructions may be translated into lower level instructions, prior to execution.

Certain processors have an internal hardware architecture that is designed to execute lower level instructions that typically have a fixed length and limited functionality, as compared to higher level instructions. For instance, the x86™ instruction set by Intel Corp. is an example of a higher level instruction set that has variable length instructions as well as instructions which require several different operations to be performed by the processor. In contrast, reduced instruction set computing (RISC) instructions are deemed to be lower level instructions because they may be of fixed length and support relatively few operations per instruction. Processors that have internal execution hardware that is designed for lower level instructions are equipped with decoders for translating higher level instructions into the lower level instructions prior to execution. A higher level instruction may be translated into one or more lower level instructions.

One of the problems encountered in the translation is how to optimize the fixed length of a lower level instruction set in view of the variable-length permitted with higher level instructions. Sometimes a higher level instruction set allows variable size immediates (constants). In that case, the length of the lower level instruction set may be at least as large as needed to accommodate the largest immediate defined in the higher level instruction set. However, when a program uses mostly smaller-size immediates, the resulting translated lower level instructions consume a large amount of storage area in the processor (for instance, in the processor's translated instruction cache) despite the fact that the program contains mostly smaller-sized immediates, so that much of the storage area in the cache is in effect being wasted.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION

To reduce the length of lower level instructions that have been translated from higher level instructions, a higher level instruction is decoded into first and second lower level instructions. The first lower level instruction specifies a move of a first portion of an immediate that appeared in the higher level instruction to a register of the processor. The second lower level instruction includes a pointer to the register, and also includes a second portion of the immediate. When these lower level instructions are read, for instance from a translated instruction cache, towards further decoding and execution, the first lower level instruction causes the first portion of the immediate to be stored in the register that is identified in the first lower level instruction. The immediate is then recovered after reading the second lower level instruction which points to the register: the first portion of the immediate is read from this register and merged with the second portion of the immediate. This technique allows the number of bits required for storing the immediate, in the translated instruction cache, to be reduced relative to the brute force technique of providing the maximum number of immediate bits in a single lower level instruction. This is a more space-efficient technique for storing translated instructions in the translated instruction cache of a processor.

The IA 32™ processor architecture by Intel Corp. allows for variable-size immediates of up to 32 bits. However, studies have shown that the average, which may depend upon the application, is around 10 bits. Thus, if a fixed-length format were to be used for the lower level instructions that are stored in the instruction cache, and the maximum size (namely, 32 bits) is allowed for each lower level instruction, then a relatively large number of bits in the cache are being unused on the average. The more efficient storage of immediates using an "immediate register" as described here may result in a significant reduction in the cost of the manufacture of such a processor.

Studies have also shown that many programs have a significant number of large immediates that differ from each other only in a lower portion, namely the least significant bits. Thus, if the immediate register is used to "recycle" a relatively large number of more significant bits of the immediate, then an additional improvement in space-efficiency can be obtained by referring all instructions that share those upper immediate bits to the register. Studies have demonstrated that for instruction traces averaging 30–50 instructions, 2 or 3 immediate registers are sufficient, such that only 2 bits are needed in the lower level instructions to point to these immediate registers. Thus, the overhead associated with splitting and recombining immediates is relatively small compared to the significantly reduced length of each lower level instruction.

Figure 1:
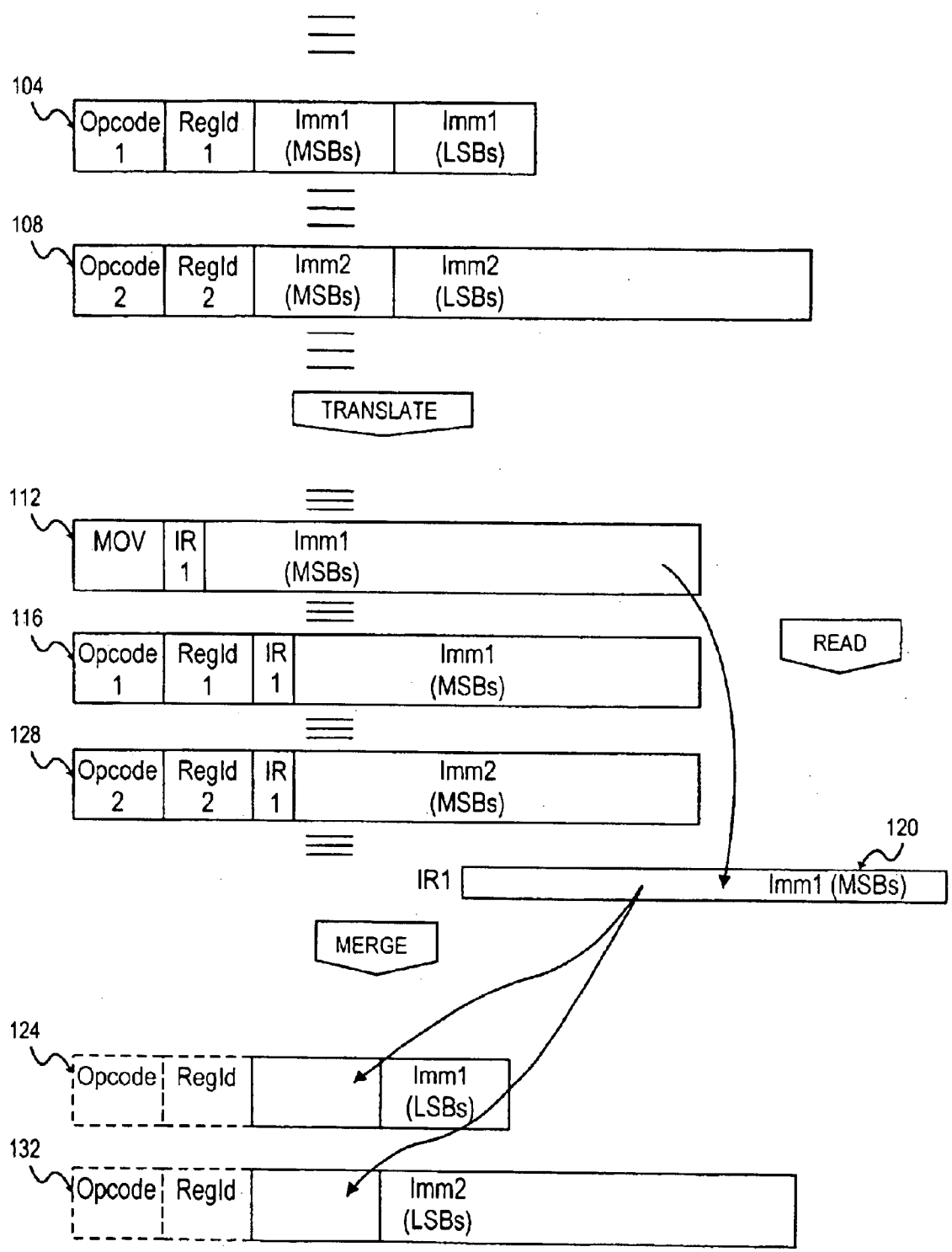
FIG. 1 illustrates a flow of instruction translation and immediate merging, according to an embodiment of the invention.

Referring now to FIG. 1, a flow diagram for instruction translation and immediate merging is described, according to an embodiment of the invention. In this example, two higher level instructions 104 and 108 (also referred to here as first and second higher level instructions) are translated. However, the invention is applicable to any number of higher level instructions. Moreover, the second higher level instruction 108 need not immediately follow the first higher level instruction 104. Indeed, as will be recognized below, the second higher level instruction 108 may be any member of a sequence of instructions that are translated into a "trace."

The flow in FIG. 1 proceeds with translating the first higher level instruction 104 into a pair of lower level instructions 112 and 116 (also referred to here as first and second lower level instructions). Note that these latter instructions may be of fixed length, as compared to the higher level instructions 104 and 108 which may be of variable length. The length of a lower level instruction is selected based upon the length of first and second portions of immediates in the higher level instruction set. The lower level instruction is long enough to allow for opcodes, operands, and register identifiers that would normally be needed in the instruction set, plus a number of bits sufficient to provide for a pointer to one or more immediate registers as well as a number of bits needed to specify the largest second portion of the largest immediate in the higher level instruction set. For example, if the largest immediate is 32 bits, and it has been determined that the optimum length for the first portion is 8 bits, then 24 bits will be needed for the second portion of an immediate in the lower level instruction set. If, for example, three immediate registers are used, then this would require two additional pointer bits, bringing the total number of bits to 26, beyond the opcode bits required by the lower level instruction set.

The first lower level instruction 112 as shown in FIG. 1 recites a move of the first portion of the immediate to an immediate register, identified as IR 1. The second lower level instruction 116 also includes the pointer IR 1, and in addition includes the second portion of the immediate (in this case, all remaining lower significant bits which are defined as not being part of the first portion).

The lower level instructions may be stored in an instruction cache (not shown in FIG. 1) before being read towards decoding and execution by the processor. The first lower level instruction 112, after being read, is "executed" to move the first portion of the immediate into an immediate register 120, identified as IR 1. The first lower level instruction is then disposed off, and does not clutter the remaining pipeline stages. When the second lower level instruction 116 is to be executed, the contents of the immediate register 120, as referred to by IR 1 in the second lower level instruction 116, is read to obtain the first portion of the immediate. Thereafter, the first and second portions of the immediate are merged and the second lower level instruction, now in effect a "reconstructed" first instruction 124, may be further decoded and executed using the merged immediate. This merging of the first portion with the second portion may be a concatenation such as shown in FIG. 1, or it may be an addition, depending upon how the immediate was split.

The first higher level instruction 104 may include an opcode field and a pointer to a register field, in addition to an immediate field. Thus, in the exemplary scheme of FIG. 1, the translation mechanism further provides the second lower level instruction 116 with opcode 1 and reg. id 1 taken from the first lower level instruction 104. Alternatively, the translation mechanism may provide a different type of translation between the lower level and higher level instructions that contain immediates. The invention here need not be limited to any particular translation concerning the opcode and register identifier portions of a higher level instruction that contains an immediate, such that the effectively reconstructed instruction 124 need not be identical, bit-for-bit, to its corresponding higher level instruction 104.

The mechanism for splitting and combining an immediate is further illustrated by considering a second higher level instruction 108 which has a second immediate (Imm2) having an MSBs portion and an LSBs portion. According to an embodiment of the invention, this second higher level instruction 108 is translated into a third lower level instruction 128 if the second immediate has a first portion (MSBs) that has the same value as the valid content of an immediate register. Thus, the translation performs a comparison between the first portion of the immediate in a higher level instruction with the contents of the immediate registers, to determine whether there is a match. If there is, then the lower level instruction is provided with a pointer to the immediate register which already contains the matching first portion. In this way, the contents of the immediate register IR 1 have been reused, thereby providing a more space-efficient representation for a translation of the second higher level instruction 108. Thus, in the example of FIG. 1, the third lower level instruction 128 includes IR 1, to identify the register containing the first portion of the immediate. The third lower level instruction 128 also includes a second portion of the second immediate (LSBs). The third lower level instruction 128 may then be stored in the translated instruction cache (not shown in FIG. 1). If there are additional higher level instructions that have immediates with the same matching first portion as that stored in an immediate register, additional savings in storage space within the translated instruction cache may be achieved by providing a pointer to this immediate register, rather than including the actual first portion in each translated lower level instruction.

A similar merging operation applies to the second immediate Imm2. After reading the third lower level instruction 128 from the cache, the processor recognizes the pointer to the immediate register IR 1 and in response performs a read of this register to obtain the first portion of the immediate that has been previously stored therein. The processor then merges the first portion that has just been read with the second immediate's second portion that was obtained from the third lower level instruction 128. This merging in effect creates a reconstructed second higher level instruction 132 which may then be further decoded and executed by the processor.

In a further embodiment, the three lower level instructions 112, 116, and 128 may be marked by the processor as being part of an atomic trace sequence, where such a sequence can only be executed by beginning at a starting address of the sequence.

Figure 2:
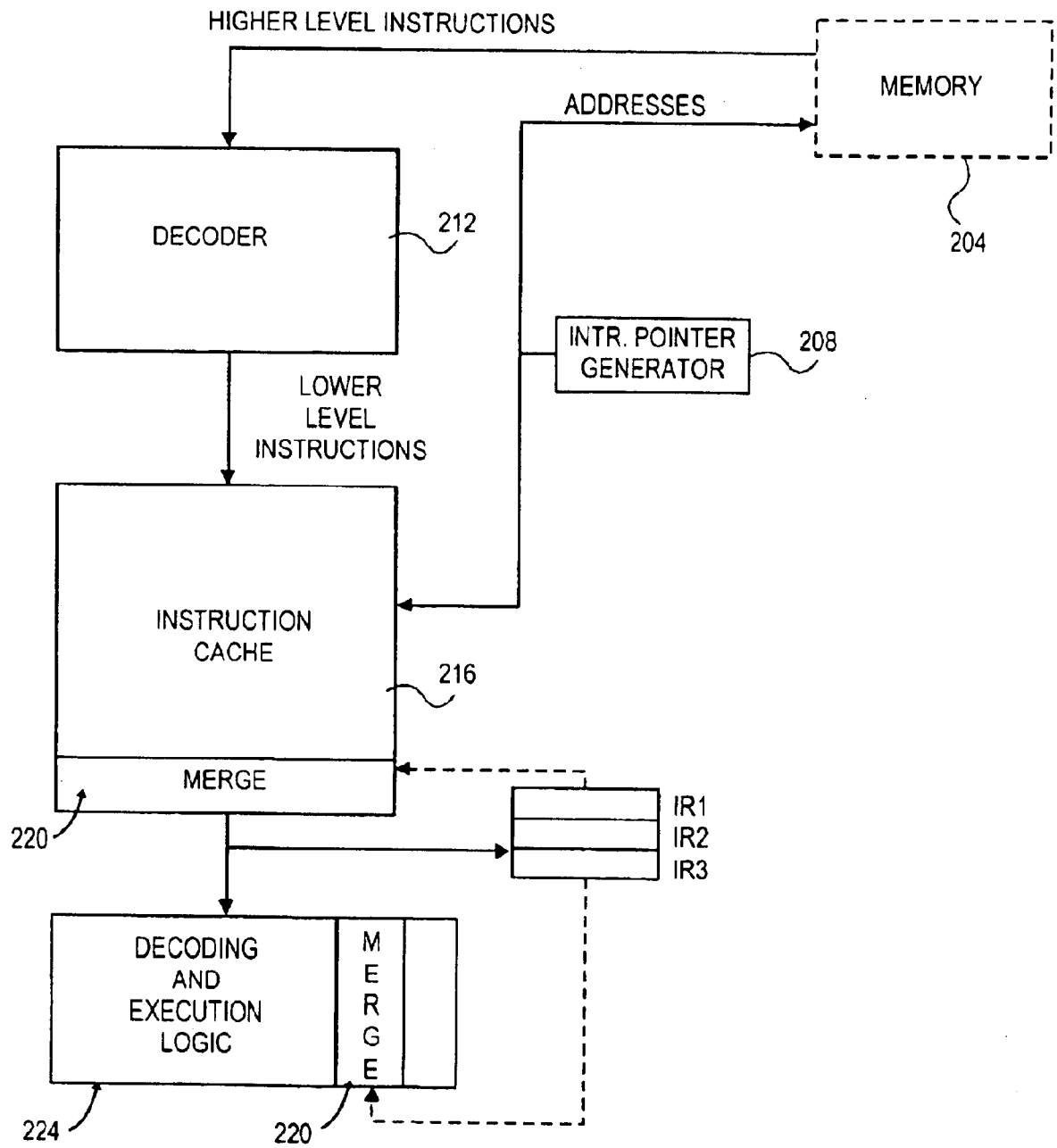
FIG. 2 illustrates a block diagram of a processor as an embodiment of the invention.

FIG. 2 illustrates an electronic system having a memory 204 to store higher level instructions and that is coupled to a processor built according to an embodiment of the invention. The processor includes an instruction pointer generator 208 which provides higher level instruction addresses that are incremented in response to a processor clock (not shown). In a particular embodiment, these addresses are for an assembly language program in an x86™ instruction set provided by Intel Corp. The higher level instructions are read from the memory 204 at corresponding x86™ addresses and are fed to a decoder 212. The decoder 212 may be a conventional instruction decoder that has been modified to translate higher level instructions containing immediates into lower level instructions based upon, for instance, the flow of FIG. 1 described above. The lower level instructions created by the decoder 212 are stored in a conventional translated instruction cache 216. The cache 216 is indexed into by the x86™ address provided by the instruction pointer generator 208.

The processor includes merge logic 220 to read a lower level instruction from the instruction cache in response to a cache hit and, if the instruction is similar to the first lower level instruction of FIG. 1, cause the first portion of an immediate to be stored in a register (IR1, IR2, or IR3 for this example) identified in the lower level instruction. The cache hit also results in a second lower level instruction to be read (such as instruction 116 of FIG. 1). In response, the register identified in the second lower level instruction is accessed to obtain the first portion of the immediate. The merging logic 220 is to merge the second portion of the immediate obtained from the second lower level instruction with the first portion that has just been read from a register. An effectively reconstructed instruction having the full length immediate may then be delivered to decoding and execution logic 224.

The merging logic 220 may be situated at either the mouth of the instruction cache 216 or somewhere in the decoding and execution logic 224. It should be noted that the registers IR1, IR2, and IR3 may be accessed in the fetch stage rather than the decode or execution stages, such that the reconstructed instruction which enters a processor pipeline has the full length of the original higher level instruction. In that case, a bubble may need to be introduced between register update and usage. The immediate register update and usage would be in the same pipe stage. Alternatively, the immediates need not be restored to their full length at the fetch stage. Rather, access to the registers may occur in later pipeline stages, to help reduce the bit width of earlier stages in the pipeline. Thus, the invention need not be limited to a particular stage of a pipeline in which the registers are accessed for obtaining the first portion of the immediates.

To summarize, various embodiments of an invention directed to a mechanism for splitting and recombining immediates, to help reduce the length of translated, lower level instructions, have been described. In the foregoing specification, the invention has been described with reference to specific exemplary embodiments thereof. It will, however, be evident that various modifications and changes may be made thereto without departing from the broader spirit and scope of the invention as set forth in the appended claims. For instance, an immediate may be a pointer to an element of an array in memory, so that immediates in successive instructions point to successive members of the same array. The immediate may alternatively be a displacement value such as an offset that is added to a base address for loading values from memory. Yet another alternative for the immediate is a target address in a branch instruction. In general, a wide range of different types of higher level instructions may feature immediates. In addition, the registers that store the first portions of immediates may be temporary registers that "exist" only for certain instruction sequences that have immediates, or they may be dedicated immediate registers. The specification and drawings are, accordingly, to be regarded in an illustrative rather than a restrictive sense.

What is claimed is:

1. A machine-implemented method comprising:

reading from memory a first higher level instruction having a first immediate; and translating the first higher level instruction into first and second lower level instructions, the first lower level instruction is to move a first portion of the first immediate to a register, and the second lower level instruction includes a) a pointer to the register and b) a second portion of the first immediate.

2. The method of claim 1 further comprising:

storing the first and second lower level instructions in a cache.

3. The method of claim 2 further comprising:

the reading the first lower level instruction from the cache and, in response, storing the first portion of the first immediate in the register.

4. The method of claim 3 further comprising:

reading the second lower level instruction from the cache and, in response, reading the register to obtain the first portion of the first immediate; and then merging the first and second portions of the first immediate.

5. The method of claim 4 wherein the first higher level instruction further includes an opcode and a pointer to a further register, and the translating further provides the second lower level instruction with a translated opcode and a translated register pointer.

6. The method of claim 3 wherein the first portion of the first immediate is one or more most significant bits of the first immediate and the second portion is the remaining bits of the first immediate.

7. The method of claim 3 further comprising:

reading a second higher level instruction having a second immediate; and translating the second higher level instruction into a third lower level instruction if the second immediate has a first portion that has the same value as a content of the register, the third lower level instruction to include a pointer to the register and a second portion of the second immediate.

8. The method of claim 7 further comprising:

storing the third lower level instruction in the cache.

9. The method of claim 8 further comprising:

reading the third lower level instruction from the cache and, in response, reading the register to obtain the first portion; and then merging the just read first portion with the second immediate's second portion.

10. The method of claim 9 further comprising:

marking the first, second, and third lower level instructions as part of an atomic trace sequence.

11. A processor comprising:

a register; and a decoder to translate a higher level instruction having an immediate into first and second lower level instructions, the first lower level instruction is to move a first portion of the immediate to the register, and the second lower level instruction includes a) a pointer to the register and b) a second portion of the immediate.

12. The processor of claim 11 further comprising:

an instruction cache to store the first and second lower level instructions.

13. The processor of claim 12 further comprising:

logic to read the first lower level instruction from the instruction cache in response to a cache hit, and in response cause the first portion of the immediate to be stored in the register.

14. The processor of claim 13 wherein the logic is to further read in response to the cache hit the second lower level instruction from the instruction cache, and in response read the register to obtain the first portion of the immediate, and merge the first and second portions of the immediate.

15. A computer system comprising:

a memory to store higher level instructions; and a processor coupled to the memory to execute the higher level instructions, the processor having a register and a decoder to translate a higher level instruction having an immediate into first and second lower level instructions, the first lower level instruction is to move a first portion of the immediate to the register, and the second lower level instruction includes a) a pointer to the register and b) a second portion of the immediate.

16. The system of claim 15 wherein the processor further comprises an instruction cache to store the first and second lower level instructions.

17. The system of claim 16 wherein the processor further comprises logic to read the first lower level instruction from the instruction cache in response to a cache hit, and in response cause the first portion of the immediate to be stored in the register.

18. The system of claim 17 wherein in the processor, the logic is to further read in response to the cache hit the second lower level instruction from the instruction cache, and in response read the register to obtain the first portion of the immediate, and merge the first and second portions of the immediate.

* * * * *